(12) United States Patent  
Simske et al.

(10) Patent No.: US 7,830,557 B2  
(45) Date of Patent: Nov. 9, 2010

(54) SYSTEM AND METHOD FOR TESTING INFORMATION-EMBEDDED REGION PRINTING

(75) Inventors: Steven J. Simske, Ft. Collins, CO (US); Malgorzata M. Sturgill, Ft. Collins, CO (US); Jason S. Aronoff, Ft. Collins, CO (US); Andrew F. Page, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 11/829,994

(22) Filed: Jul. 30, 2007

(65) Prior Publication Data

US 2009/0034825 A1 Feb. 5, 2009

(51) Int. Cl.
*G06K 5/00* (2006.01)
*G06K 15/02* (2006.01)
*G06K 19/00* (2006.01)

(52) U.S. Cl. .................. 358/3.28; 358/3.24; 358/1.15; 358/1.18; 358/504; 358/406; 340/5.86

(58) Field of Classification Search .................. 358/1.9, 358/3.23, 3.24, 1.14, 1.15, 1.16, 1.18, 501, 358/504, 527, 525, 401, 403, 406, 444, 3.28; 382/135, 141, 112; 700/97; 340/5.86
See application file for complete search history.

(56) References Cited

U.S. PATENT DOCUMENTS

| | | | |
|---|---|---|---|
| 6,674,875 B1 | 1/2004 | Phillips et al. | |
| 6,689,035 B1 * | 2/2004 | Gerber | 700/97 |
| 7,359,098 B2 * | 4/2008 | Suenaga et al. | 358/504 |
| 2002/0171868 A1 * | 11/2002 | Yoshimura et al. | 358/1.15 |
| 2002/0191199 A1 * | 12/2002 | Imada et al. | 358/1.1 |
| 2003/0174357 A1 * | 9/2003 | Lester et al. | 358/1.15 |
| 2004/0061884 A1 * | 4/2004 | Yamaguchi | 358/1.9 |
| 2006/0126106 A1 * | 6/2006 | Harrington | 358/1.15 |
| 2006/0147082 A1 | 7/2006 | Jordan et al. | |
| 2006/0180661 A1 | 8/2006 | Grant et al. | |

OTHER PUBLICATIONS

Bacheldor, B., "U.S. Senate Bill Proposes Technology to Authenticate Drugs", RFID Journal, May 18, 2007, http://www.rfidjournal.com/article/articleprint/3322 ( 2 pgs).

Roberts, R., "The Role of Nanotechnology in Brand Protection," Packaging Digest, Jan. 2007, pp. 34-40 (reprinted from www.rfidjournal.com).

Kutter, M., "Brand Protection with Micro-Dots," Jan. 1, 2007, Available at: http:// pffc-online.com/mag/brand-protection-with-micro-dots.

* cited by examiner

*Primary Examiner*—Scott A Rogers

(57) ABSTRACT

A method for testing a printing system for printing information-embedded regions includes transmitting a test sheet data file to a print service provider. The test sheet data file includes a plurality of complete or incomplete information-embedded regions. A sample printed using the test sheet data file is received from the print service provider. The printed sample is evaluated, and a record of the evaluation is created. The evaluation record is stored.

19 Claims, 1 Drawing Sheet

SYSTEM AND METHOD FOR TESTING INFORMATION-EMBEDDED REGION PRINTING

BACKGROUND

The present disclosure relates generally to systems and methods for testing security deterrent printing.

Security printing and publishing is an important component of product differentiation, tracking and authenticating, as well as of anti-counterfeiting initiatives. Security printing involves providing each package with a unique ID, in the form of, for example, a deterrent or mark. Such unique identifiers may be overt and/or covert, and may contain authenticable data. Since unique identifiers compete with branding, sales information, or other product information for real estate on the packaging, it may also be desirable to include multiple levels of security and functionality.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals having a previously described function may not necessarily be described in connection with subsequent drawings in which they appear.

DETAILED DESCRIPTION

Figure 1:
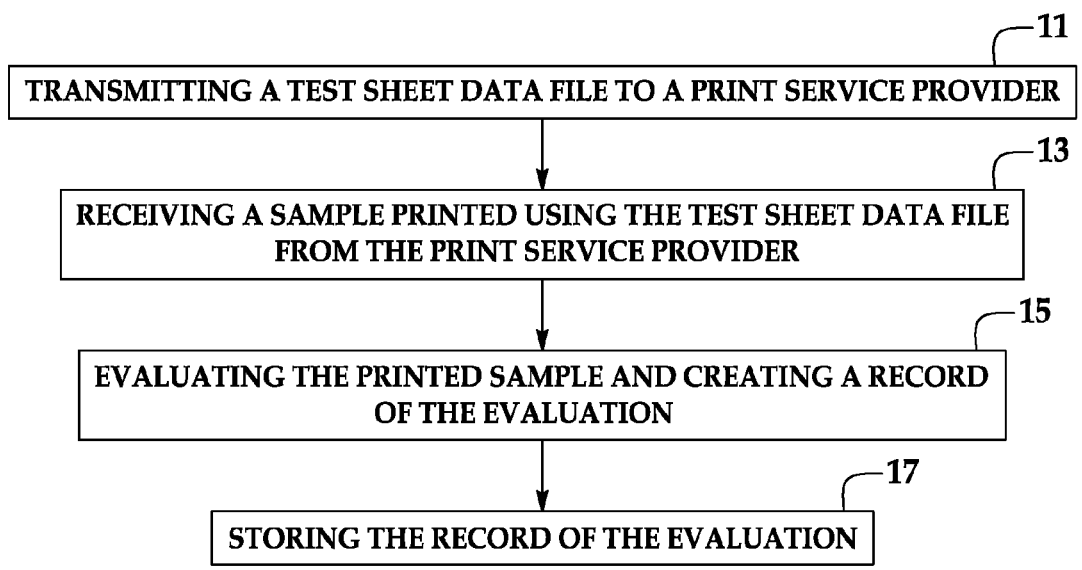
FIG. 1 is a flow diagram depicting an embodiment of the method for testing a printing system for printing security deterrents.

Embodiments of the method and system disclosed herein advantageously incorporate the following targets: the print quality of information-embedded regions (e.g., security deterrents) or elements of information-embedded regions, pre-compensation determination, and print idiosyncrasy analysis and archiving. It is believed that the combination of these targets enables a user to qualify a printer or a print service provider for use in security printing and publishing by i) substantially ensuring information-embedded region print quality is sufficient for subsequent authentication, ii) determining optimal pre-compensation settings for the print run, and iii) determining what, if any, printer-specific print idiosyncrasies (also known to those skilled in the art as "print parasitics") are associated with the print run, substrate, inks, layers, or the like, or combinations thereof. It is further believed that using pre-compensation settings may substantially prevent counterfeiting, in part because would-be counterfeiters are required to match all aspects of the print run in order to pass the counterfeit product through normal authentication systems.

As used herein, the phrase "print idiosyncrasies" means patterns/marks in a print sample that result from behavior peculiar to the print technology, the individual printer, the print job, or combinations thereof. These idiosyncrasies are "artifacts" of the printing; that is, they are not specified by the raster files that are entered into the printer's raster image printing hardware. These artifacts are introduced into the printed region by, for example, one or more of the following: (1) the ink/medium or inks/media chosen for the printing; (2) the substrate chosen on which to print; (3) the printer technology (i.e., printhead, engine, technology used for ink/medium transfer, etc.); (4) the printer settings (ink dot size, halftone/dithering/etc. approach, saturation, etc.); (5) the environmental conditions (temperature, humidity, etc.); and (6) attributes of the image to be printed.

These idiosyncrasies may be considered intrinsic to the specific variable (ink, substrate, etc.) if they consistently and predictably occur when those variables take on a particular setting. However, because of the number of variables involved, these artifacts may be, in general, considered referent to the particular values of each of the variables. That is, the idiosyncrasies are a function of at least the six variables listed above. Because of this, the nature of the idiosyncrasies may be controlled by choosing the ink, substrates, printer and print settings, etc., such that a predictable type of "parasitics" are obtained given these settings. Once a print job is ready for deployment, these settings are fixed, and the print idiosyncrasies may advantageously be heuristically (experimentally) evaluated from the test sheet data file disclosed herein.

The system disclosed herein also advantageously ties numerous independent components together, such as the brand owner, the security deterrent generator, the print service provider, the authentication system, and the security registry.

Referring now to FIG. 1, an embodiment of the method for testing a printing system for printing information-embedded regions includes transmitting a test sheet data file (of one or more printable sheets) to a print service provider, as shown at reference numeral 11; receiving a sample printed using the test sheet data file from the print service provider, as shown at reference numeral 13; evaluating the printed sample and creating a record of the evaluation, as shown at reference numeral 15; and storing the record of the evaluation, as shown at reference numeral 17. It is to be understood that this and other embodiments of the method are discussed further hereinbelow.

Figure 2:
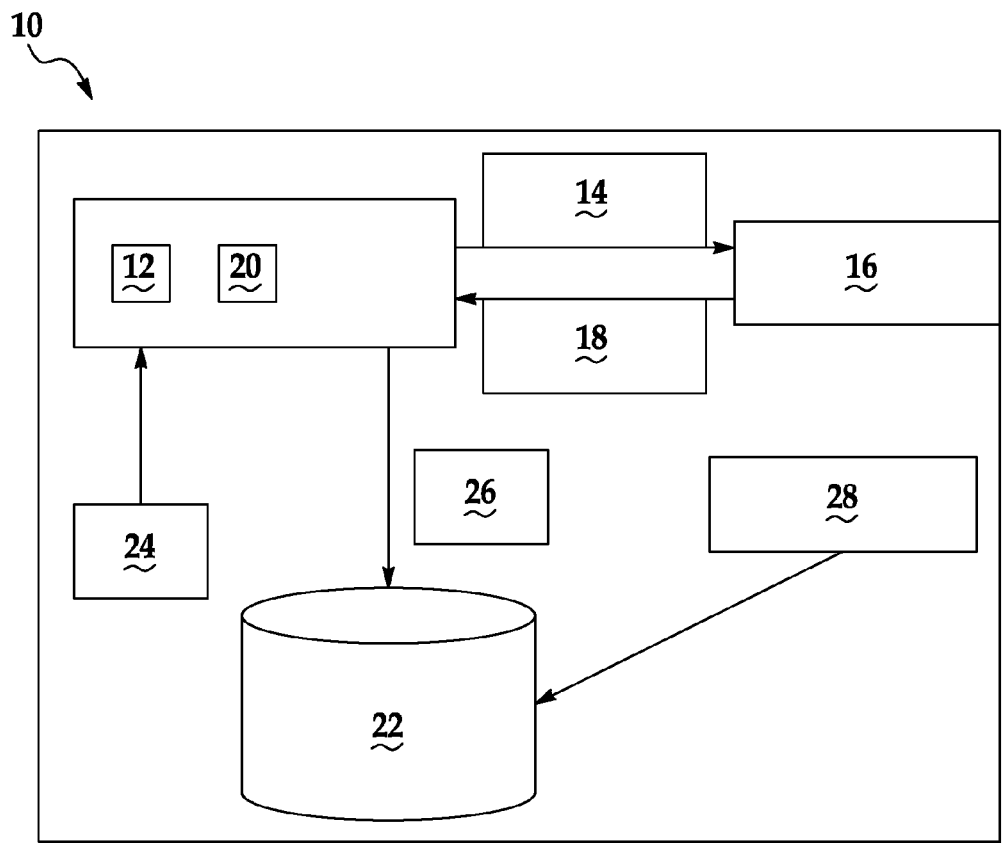
FIG. 2 is a schematic diagram depicting an embodiment of the system for testing security deterrent printing.

FIG. 2 depicts an embodiment of the system 10 for testing information-embedded region printing. The system 10 includes a generation system 12, which generates the test sheet data file 14. The test sheet data file 14 includes a plurality of complete or incomplete information-embedded regions. The test sheet data file 14 may include information-embedded regions having different specifications (e.g., size, density, characteristics, etc.); atomic or primitive elements of different information-embedded regions to test characteristics of color, frequency, etc. of information-embedded regions not explicitly printed on the test sheet data file 14; and/or pre-compensated information-embedded regions.

It is to be understood that the information-embedded regions may be selected from any shape or form that is capable of having information embedded therein. In one embodiment, the information-embedded region is a security deterrent. Examples of suitable security deterrents include, but are not limited to color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, or the like, or combinations thereof.

In some embodiments, the information embedded within the regions is authenticating information, security information, or both. The embedded information may be for tracking, branding, or the like, or various combinations thereof. In other embodiments, the embedded information is decoy information meant to mislead an unintended recipient of that information. It is also to be understood that a single information-embedded region may have hidden therein any combination of the above, as desired; for example, security and tracking information, as well as some decoy information.

Further, it is to be understood that the information may be, for example, a code; a sequence of bits, bytes, characters, colors, graphics, numbers, etc.; a watermark; symbols; interpretable information; a fingerprint(s); other biometric data (e.g., encoded, encrypted, scrambled, chained to other information); a "payload"; modulation transfer functions (e.g., used in conjunction with a target pattern); or the like; or combinations thereof. Examples of regions, information contained therein, or combinations thereof are described further in the following patent applications, each of which is incorporated herein by reference in its entirety: U.S. patent application Ser. Nos. 11/465,763 filed Aug. 18, 2006; Ser. No. 11/414,113 filed Apr. 28, 2006; Ser. No. 11/076,534 filed Mar. 8, 2005; and Ser. No. 11/192,878 filed Jul. 29, 2005.

In some embodiments, the information-embedded regions are tacitly modified. As used herein, tacitly modified information-embedded regions are those that have at least a portion varied, changed or removed such that the actual information-embedded region is not depicted in the test sheet data file 14.

As previously mentioned, in an embodiment, the test sheet data file 14 includes one or more pre-compensation methods. Pre-compensation methods involve four different categories through which information-embedded region print and reading related effects may be anticipated and pre-compensated for in a raster file/raster image/bitmapped image that is ultimately sent to a print service provider 16 (discussed further hereinbelow). As used herein, "raster file/raster image/bitmapped image" means a picture composed of individual dots (picture elements, pixels) the way a scanner perceives it. A raster is generally defined by location and includes many bits/pixel. In some non-limiting examples, the rows in a high-resolution raster file may contain 600, 812.8, 1200 or 2400 (and so forth) dots per horizontal inch of the original drawing, and there may be 600, 812.8, 1200 or 2400 (and so forth) rows per vertical inch. Pre-compensation methods are further described in U.S. patent application Ser. No. 11/810,743, filed Jun. 6, 2007, incorporated herein by reference in its entirety.

The test sheet data file 14 may include quality characteristics that are associated with, for example, a full set of information-embedded regions that may be printed. The test sheet data file 14 may include different information-embedded regions, portions of different information-embedded regions, and different information-embedded region patterns, which may be subjected to different characterization tests. In an embodiment, the types of patterns that may be selected include color, frequency, gamut and contrast, and segmentation and region statistics. It is to be understood that the patterns may be pre-compensated, as is desirable.

Colors may be included in the test sheet data file 14 to test for color accuracy (e.g., via spectrophotometric measurement). Spot colors may be proprietary of and/or licensed through a company such as, for example, Pantone, Inc., Carlstadt, N.J.

The test sheet data file 14 may also be used to test for color trapping. As used herein, color trapping means overlapping of two adjacent inks, either intentionally to compensate for mis-registration, or unintentionally as a result of the specific device/colorant behavior (print idiosyncrasy or parasitic). Color trapping may be tested for by printing the predominant palette colors side by side on the test sheet data file 14 with staggered amounts of overlap (e.g., 1, 2 and 3 pixels).

As non-limiting examples, color bars, color tiles and colored guilloches may be included in the test sheet data files 14. In one embodiment, color bars are incorporated as a series of colored lines of varying thickness, with white spaces (also of varying thickness, if desirable) between them. In another embodiment, color tiles are likewise incorporated in the test sheet data files 14 with variable spacing and/or overlap between them, in part to test for ink spreading, color trapping, or combinations thereof. In still another embodiment, the guilloche patterns may be included to test fine details, colors, curvatures, or combinations thereof.

Registration error may also be assessed using color bars, 1-dimensional bar codes having more than one type of black, or any family of shapes (lines, tiles, bars, glyphs, etc.). It is to be understood that polygonal shapes may also be used to assess banding around the edges (which may be a color trapping artifact).

Furthermore, including bars, tiles and curves of the same hue throughout the test sheet data file 14 may be used to assess substrate-induced texture, color constancy, reflectance, shading, or combinations thereof. Replicating the same deterrents in several locations on the test sheet data file 14 may be used to ensure printing consistency and authentication consistency.

Frequency consideration includes the following attributes of a printed information-embedded region: halftone frequencies and type (AM, FM, error diffusion, etc.) angles, registration error, line thickness, tile dimensions, edge magnitude, sharpness, graininess, or combinations thereof.

Information-embedded regions included in the test sheet data file 14 to address frequency include those specifying a halftone/error diffusion for a spot color area. This may be used to test authenticability of the halftone angle in two ways: (1) through direct analysis (Hough transform) in the case of a given halftone angle (e.g., peak angle identification via a Hough transform operating on the dots), and (2) an error diffusion raster may be printed with the seed to its error generator being something else on the test sheet data file 14. It is believed that if the dots are placed accurately enough relative to each other, it is possible to reconstruct the key if the relationship between the key and the dot pattern is known (i.e., the dot pattern may be generated directly from the key).

Line thicknesses and tile dimensions may be varied to test the dot size and ink spread on the substrate. Linear and tile patterns may also be used to measure edge magnitude and sharpness. Graininess may be measured from the frequency (e.g., FFT) transforms of the deterrents, which accounts for filling in small features or the existence of gaps in presumed solid areas.

Color gamut may be tested by including color deterrents. Generally, colors that are on the border of the ink gamuts, but are within tolerances of repeatability, may be selected since such colors will likely be the most difficult to reproduce. In some embodiments (e.g., those with a calorimetric rendering intent or device colors in the test sheet data file 14), colors covering as much of the color space as possible are included as part of the test sheet data file 14. If a default color space is selected, all color gamuts are technically equal; as such, the color pipeline is specified in order to generate a desired color gamut.

Gray scale dynamic range and contrast may be tested using any pattern in which each gray level is represented uniformly. In one non-limiting example, copy-sensitive patterns (e.g., entropy based patterns) are used in the test sheet data file 14 to test for gray scale dynamic range and contrast.

Segmentation and region statistics may also be used to form the test sheet data file 14. The information-embedded region included in the test sheet data file 14 may be based on statistics obtained from regions automatically extracted (segmented) from a series of graphics. The segmented regions may include actual test information-embedded regions, facsimiles of information-embedded regions (i.e., steganographic marks or feature(s) that is/are visible to the naked eye, but may contain information of interest hidden or obscured therein), or simply areas in graphic/photo areas that share characteristics (e.g., entropy, hue, gamut, fine detail, etc.) with one or more information-embedded regions that are not included in the test sheet data file 14 for security reasons.

The segmentation and segmented regions may be analyzed to assess steganographic fidelity, color palette reproducibility, readability of latent (copy-sensitive, watermark, Moiré, etc.) patterns, or combinations thereof, as such characteristics are often present simultaneously in the same graphic/segmented area. It is to be understood that these images may be used to indirectly test trapping, color bleed, etc., since errors in color registration often result in different automatic segmentations.

In some embodiments, the test sheet data file 14 simultaneously includes 1) means for testing print quality, 2) deterrent readability, and 3) speculative pre-compensation methods.

As shown in FIG. 2, the test sheet data file 14 is sent from the generation system 12 to the print service provider 16. The print service provider 16 generates a printed sample 18 using the test sheet data file 14, and sends the printed sample 18 to an analysis system 20. The analysis system 20 evaluates the printed sample 18 and creates a record 26 of the evaluation. Such a record 26 may be stored in a storage system 22.

It is to be understood that the generation system 12 and the analysis system 20 may be configured as a computer program, configured as an Internet enabled program, embedded into a device (such as generation system 12), embedded into a scanner (2D), or the like. Generally, the systems 12, 20 are operatively connected or configured so as to function as a single entity. In one embodiment, the storage system 22 also functions as a single entity with the systems 12, 20.

Evaluating the printed sample 18 includes checking the printed sample 18 for print quality and print idiosyncrasies, deterrent readability, printing effects from pre-compensation methods, or the like, or combinations thereof. It is to be understood that the printed sample 18 may be compared to the test sheet data file 14 during the evaluation. The analysis system 20 is capable of analyzing and archiving any desirable and undesirable features of the printed sample 18.

The evaluation may also include an assessment of the effectiveness of printing of each pre-compensation method present in the test sheet data file 14. It is to be understood that pre-compensated methods included in the test sheet data file 14 may result in printed deterrents which more closely resemble the intended marks than the intended marks themselves do following printing. In this embodiment, the printed sample 18 is reviewed to determine if the pre-compensation methods enhanced the printed sample 18.

As previously mentioned, the evaluation record 26 may be stored in the storage system 22. The storage system 22 may be a security campaign registry, a secured server, or some other type of registry. It is to be understood that such records 26 may be accessed and utilized at any time. As a non-limiting example, it may be desirable to access and utilize a particular evaluation record 26 when creating a deterrent data file that will be sent out for actual printing of the information-embedded regions (e.g., security deterrent(s)). In one embodiment, the owner 24 of the product/object upon which the information-embedded regions will be printed signs off on the evaluation record 26 and authorizes its storage. The owner 24 generally verifies that the final job will print with the desired information density and print quality using a selected printer, ink, substrate, settings, etc.

The record 26 may contain a security printing campaign, which includes, for example, a plan for the information-embedded regions to be used in a particular print job, a substrate to used, an ink or combination of inks to be used, an object/package to be used, a device to be used for authenticating, or combinations thereof. The security campaign may also incorporate a set of information-embedded regions (e.g., overt, covert, and/or forensic deterrents) that are used to secure and/or authenticate a product associated therewith, and identify how information, if any, is placed into the entire set of information-embedded regions.

After the evaluation takes place, a deterrent data file that is to be sent out for actual printing of the information-embedded region(s) may be created. Generally, the deterrent data file is compiled based on the evaluation record 26. In one embodiment, the deterrent data file includes a plurality of complete, unmodified information-embedded regions that are desirable on an object/package. In another embodiment, the deterrent data file includes a preferred information-embedded region that is selected from, based on the evaluation of the printed sample 18, the plurality of complete, unmodified information-embedded regions.

In one embodiment, one or more pre-compensation methods are selected for the deterrent data file based on the evaluation. Generally, any pre-compensation methods used in the test sheet data file 14 that resulted in a desirable printed sample 18 may be selected for the deterrent data file. Furthermore, new pre-compensation methods may also be selected for the deterrent data file. In an embodiment, the pre-compensation methods selected for the deterrent data file are optimized for a particular security printing campaign.

The deterrent data file may also attempt to identify/rectify print idiosyncrasies present in the printed sample 18. As a non-limiting example, attempts to identify idiosyncrasies may include varying (in the deterrent data file) aspects of the printed features (e.g., angle, dimension, color, apposing colors, etc.) or other aspects of the print settings, substrates, inks, or combinations thereof, to determine which of these variances print with the least objectionable idiosyncrasies. The settings that result in the least objectionable print idiosyncrasies may then be deployed, if desired, for the full print job.

The deterrent data file may then be sent to the print service provider 16, which prints the information-embedded region (s) (from the deterrent data file) on the package/object. The package/object having the information-embedded region(s) printed thereon is then compared (by the analysis system 20) to the stored record 26 of evaluation. This allows a user or the analysis system 20 to substantially ensure that any desirable features of the printed sample 18 are included in the printed information-embedded region, and to substantially ensure that any undesirable features of the printed sample 18 are rectified in the printed information-embedded region. Furthermore, the comparison allows one to determine if the printed security deterrent is printed in a manner sufficient to allow for effective subsequent authentication.

The printed information-embedded region(s) may also be stored and/or registered with the storage system 22.

The product/object containing the printed information-embedded region(s) may be authenticated at any point after the product/object is received. As non-limiting examples, a retailer, a consumer, or an inspector may initiate authentication. The authentication device or system 28 used is capable of information extraction from an image/region. In one embodiment, authentication is accomplished using a specifically crafted algorithm/system to read the image/region and decode the embedded information.

Embodiments of the method and system disclosed herein include, but are not limited to the following advantages. Information-embedded region (e.g., security deterrent) testing may be advantageously associated simultaneously with i) print service provider 16 auditing and approval, ii) deterrent quality assurance (i.e., validating that the information-embedded region(s) print properly for subsequent authentication), iii) information-embedded region optimization through pre-compensation and matching the information-embedded region selection to the print quality, and iv) determining print idiosyncrasies specific to the print service provide 16 and its equipment.

While several embodiments have been described in detail, it will be apparent to those skilled in the art that the disclosed embodiments may be modified. Therefore, the foregoing description is to be considered exemplary rather than limiting.

What is claimed is:

1. A method for testing a printing system for printing information-embedded regions, the method comprising:
   transmitting a test sheet data file to a print service provider, the test sheet data file including i) a plurality of complete or incomplete information-embedded regions and ii) a plurality of pre-compensation methods;
   receiving a sample printed using the test sheet data file from the print service provider;
   evaluating the printed sample and creating a record of the evaluation;
   storing the record of the evaluation; and
   selecting at least one pre-compensation method or a combination of pre-compensation methods based on the evaluation.

2. The method of claim 1 wherein evaluating the printed sample and creating a record of the evaluation includes analyzing and archiving print idiosyncrasies evident on the printed sample.

3. The method of claim 1 wherein selecting includes optimizing the at least one pre-compensation method for a predetermined security printing campaign.

4. The method of claim 3 wherein the predetermined security printing campaign includes a predetermined substrate, a predetermined ink or combination of inks, and a predetermined device for authenticating the printed security deterrent.

5. The method of claim 1, further comprising:
   communicating a deterrent data file including a plurality of complete, unmodified information-embedded regions and the at least one pre-compensation method or combination of pre-compensation methods to the print service provider; and
   comparing an information-embedded region, printed from the deterrent data file on an object, to the stored record of the evaluation.

6. The method of claim 5 wherein the deterrent data file includes at least one pre-compensation method.

7. The method of claim 5, further comprising determining, based on the comparison, if the printed information-embedded region was printed in a manner sufficient to allow for successful later authentication.

8. The method of claim 7, further comprising deciding, based on the determining, if a potentially suspect information-embedded region is authentic.

9. The method of claim 1 wherein the evaluation includes an assessment of effectiveness of printing of each of the plurality of pre-compensation methods.

10. The method of claim 1, further comprising determining at least one preferred information-embedded region from the plurality of complete information-embedded regions based on the evaluation of the printed sample, wherein the plurality of complete information-embedded regions are unmodified.

11. The method of claim 1 wherein the record is stored in a secured server or registry.

12. The method of claim 1 wherein at least some of the plurality of complete or incomplete information-embedded regions are tacitly modified such that the test sheet data file includes tacitly modified regions having at least a portion varied, changed, or removed such that an actual information-embedded region is not depicted in the test sheet data file.

13. A system for testing information-embedded region printing, the system comprising:
   a test sheet data file including a plurality of complete or incomplete information-embedded regions and plurality of pre-compensation methods;
   a print service provider configured to generate a sample printed using the test sheet data file;
   an analysis system configured to evaluate the printed sample and create a record of the evaluation; and
   a storage system configured to store the evaluation record.

14. The system of claim 13 wherein the information-embedded regions are selected from color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, and combinations thereof.

15. The system of claim 13 wherein the analysis system is configured to analyze and archive print idiosyncrasies evident on the printed sample.

16. The system of claim 13 wherein the print service provider is configured to generate an information-embedded region using a deterrent data file including a plurality of complete, unmodified information-embedded regions and at least one pre-compensation method or combination of pre-compensation methods, and wherein the analysis system is configured to compare the generated information-embedded region to the stored evaluation record.

17. The system of claim 16, further comprising:
   a security campaign registry configured to register the generated information-embedded region; and
   an authentication system configured to authenticate the generated information-embedded region.

18. The system of claim 13, further comprising a generation system configured to generate the test sheet data file.

19. The system of claim 13 wherein at least some of the plurality of complete or incomplete information-embedded regions are tacitly modified such that the test sheet data file includes tacitly modified regions having at least a portion varied, changed, or removed such that an actual information-embedded region is not depicted in the test sheet data file.

* * * * *

UNITED STATES PATENT AND TRADEMARK OFFICE
CERTIFICATE OF CORRECTION

PATENT NO.      : 7,830,557 B2
APPLICATION NO. : 11/829994
DATED           : November 9, 2010
INVENTOR(S)     : Steven J. Simske et al.

It is certified that error appears in the above-identified patent and that said Letters Patent is hereby corrected as shown below:

In column 8, line 23, in Claim 13, delete "and plurality" and insert -- and a plurality --, therefor.

Signed and Sealed this
Twenty-second Day of March, 2011

David J. Kappos
*Director of the United States Patent and Trademark Office*